Patented Jan. 27, 1948

2,435,005

UNITED STATES PATENT OFFICE 2,435,005

SKIN PROTECTIVE OINTMENT

Walter F. Huppke, New York, and Axel L. Sodergreen, Great Neck, N. Y., assignors to West Disinfecting Company, Long Island City, N. Y., a corporation of New York No Drawing. Application June 6, 1944,
Serial No. 539,012

5 Claims. (Cl. 167—90)

The present invention relates to skin protective creams or ointments.

It is among the objects of the invention to provide a protective cream or ointment that dries promptly when applied, to provide an elastic covering film that adheres tenaciously to and flexes with the skin without likelihood of washing off by perspiration or externally applied moisture, which is effective to perform its protective function for many hours but yet does not inhibit transpiration, and which film may be readily washed off with a warm soap solution.

Another object is to provide an ointment or cream of the above type which may be readily prepared of ingredients that are relatively common and of low cost, which will not decompose, deteriorate, become rancid or otherwise degenerate while enclosed in air-tight cans, which is not absorbed by the skin and has no toxic effect upon the skin and, in its preferred embodiment, does not stain or disfigure the skin to which it is applied and, in fact, forms a film on the skin that is substantially invisible to the naked eye.

Another object is to provide a cream or ointment of the above type, the active ingredient of which may be an effective insect repellent, a protection against the actinic light rays or may serve for both purposes concurrently, if desired.

The invention involves the use, as the carrier or vehicle, of an adsorbent material which may be finely divided clay, kieselguhr, or diatomaceous earth, but is preferably an inorganic gelatinous, hydrous oxide such as aluminum hydrate, ferric hydrate or zirconium hydrate, but the most practical and efficacious embodiment for many applications is silicic acid jelly, known as silica gel.

The active ingredient is intimately admixed with the adsorbent, such ingredient being insect repellent, light screening compound, or a combination of both. For long effectiveness the active ingredient is preferably an organic compound of the water-insoluble, alcohol-soluble type and is adsorbed by the vehicle or carrier. The insect repellent is a liquid that has a sufficiently low vapor pressure slowly to pass off from the surface of the adsorbent to perform its function. The light screening ingredient, if used, may be a solid or a liquid. Unlike the insect repellent it does not pass off, but it is spent by decomposing under the influence of sunlight.

Preferably, the cream or ointment includes also a film-forming material dissolved in a suitable adequately volatile solvent which evaporates shortly after application of the cream to the skin, to leave the desired elastic porous dry film.

The composition also preferably includes a small proportion of a suitable wetting agent to promote facility of washing off the film by use of any common detergent.

The carrier or vehicle of inorganic gelatinous hydrous oxide, preferably silica gel, may be prepared by mixing dilute sodium silicate solution with the required amount of dilute hydrochloric acid. The resulting gelatinous mass is washed by stirring into hot water and filtering and repeating said steps until the mass is relatively free of chlorides. The gelatinous mass is then subjected to successive washings desirably with 99 per cent isopropyl alcohol, which alcohol replaces the aqueous component of the gelatinous mass and forms an alcogel. After the gelatinous precipitate thus formed as an alcogel has been filtered off, it is in condition for mixture with the other ingredients, in manner to be set forth below.

The insect repellent is an organic compound, liquid at room temperature relatively insoluble in water, but soluble in alcohol. A number of such compounds are known to have insect repellent properties, a particularly desirable one being dimethyl phthalate, but others that are likewise suitable are ethylhexanediol, ethyl mandelate, ethyl phenyl ethanolamine, methyl anthranilate, p-ethoxyacetophenone, 2-ethyl hexyl ether of diethylene glycol and isopropyl cinnamate, or mixtures of two or more of said compounds. All of the foregoing insect repellents are water-insoluble and alcohol-soluble and in appearance and viscosity resemble glycerin. They have a fairly high molecular weight and a fairly high boiling point and for this reason may be readily adsorbed onto the silica gel without being taken up by the skin. They also have a fairly low vapor pressure and will slowly evaporate to perform their insect repellent function.

The film-forming material may be of any suitable natural or synthetic gum or resin, or mixtures thereof. Preferably, the film-forming material is a mixture of ethyl cellulose and shellac, for such mixture in proper proportions results in a film with the correct degree of elasticity and tenacity to adhere to and flex with the skin, and it is sufficiently porous not to interfere with normal perspiration from the skin glands. A film of ethyl cellulose is too hard, does not have enough porosity to permit transpiration and, moreover, tends to blister loose. Shellac alone, on the other hand, does not form an effective film for it tends to stay sticky because the repellent used serves as an effective plasticizer therefor.

The film-forming or lacquer material is dissolved in a suitable solvent which preferably comprises a mixture of isopropyl alcohol and acetone. These solvent ingredients are used in suitable proportions for evaporation thereof under conditions of use at the desired rate, promptly to form the dry film upon the skin. The solution is a transparent liquid having about the consistency of molasses. The lacquer solvent mixture of isopropyl alcohol and acetone dries fairly rapidly from said transparent liquid, and its odor is not too offensive. If slower drying is necessary, as for instance, if the can containing the ointment or cream must be kept open constantly, normal butyl alcohol may be substituted for the acetone.

The cream or ointment being devoid of water, the wetting agent must, of course, be of the alcohol-soluble type. Depending upon the effectiveness of that agent and the amount used, the facility of washing off the cream from the skin with the use of detergent may be predetermined. In practice, any of numerous detergents may be employed, among which are alkyl sulfate, alkyl aryl sulfonates, sodium lauryl sulfate and sodium aryl alkyl ether sulfates. That alkyl sulfate known under the trade-mark of "Duponol" has been used with particular advantage.

For light screening protection any of various materials, preferably relatively insoluble in water and soluble in alcohol and which are effective to render actinic rays innocuous, either by blocking them or suitably changing their wave length, may be incorporated in the cream or ointment. Among these materials are the following: phenyl salicylate, benzyl cinnamate, menthyl anthranilate and dibenzal acetone, but, in general, menthyl salicylate is preferred. All these are water-insoluble and alcohol-soluble, and at room temperature all are liquids.

Where the ointment is to serve as a light screen and not essentially as an insect repellent, the light screening compound would replace the insect repellent in the composition above described, but preferably a small amount of dimethyl phthalate or the like would be incorporated in the light screening ointment to serve as a plasticizer for the lacquer film.

Where the composition is to serve both as an insect repellent and as a light screen, the active repellent and the active screening ingredient might be used in proportions varying from 1 to 3 parts of the repellent to 3 to 1 part of the screening material, depending on the specifications desired.

In the following tabulation is given a typical formula of insect repellent ointment or cream, the proportions of the respective ingredients being stated by weight, said tabulation also giving substantially the maximum and minimum limits of variations in said proportions.

|  | Minimum | Maximum | Typical |
| --- | --- | --- | --- |
| Silica Gel | 5 | 15 | 7.3 |
| Repellent (Dimethyl Phthalate) | 10 | 30 | 27 |
| Ethyl Cellulose | 10 | 15 | 13.2 |
| Shellac | 5 | 15 | 10 |
| Isopropanol | 20 | 30 | 21 |
| Acetone | 20 | 30 | 21 |
| Wetting Agent (Duponol) | 0.5 | 1 | 0.5 |

A typical formula to serve both as an insect repellent and as a light screening ointment or cream, as well as the limits of maximum and minimum proportions of the ingredients is as follows:

|  | Minimum | Maximum | Typical |
| --- | --- | --- | --- |
| Silica Gel | 5 | 15 | 7.3 |
| Repellent (Dimethyl Phthalate) | 7 | 20 | 18 |
| Menthyl Salicylate | 3 | 10 | 9 |
| Ethyl Cellulose | 10 | 15 | 13.2 |
| Shellac | 5 | 15 | 10 |
| Isopropanol | 20 | 30 | 21 |
| Acetone | 20 | 30 | 21 |
| Wetting Agent (Duponol) | 0.5 | 1 | 0.5 |

A formula of ointment or cream, preferred as a protection against actinic rays, but not especially as an insect repellent, might have the following proportions by weight:

|  | Minimum | Maximum | Typical |
| --- | --- | --- | --- |
| Silica Gel | 5 | 15 | 7.3 |
| Light Screening material (menthyl salicylate) | 3 | 10 | 9 |
| Plasticizer (dimethyl phthalate) | 7 | 10 | 9 |
| Ethyl Cellulose | 10 | 15 | 13.2 |
| Isopropanol | 20 | 30 | 21 |
| Acetone | 20 | 30 | 21 |
| Wetting Agent (Duponol) | 0.5 | 1 | 0.5 |

To prepare the composition, the inorganic gelatinous hydrous oxide such as aluminum hydrate, ferric hydrate or zirconium hydrate is prepared by precipitation from any desired salt thereof, washing relatively free of chlorides by stirring into hot water and filtering alternately and then displacing the water by successive washing with suitable alcohol. Specifically, for preparing silica gel for the purposes of the present invention, dilute sodium silicate solution is mixed with the required amount of dilute hydrochloric acid. The resulting gelatinous body is washed by alternately stirring in hot water and filtering until the mass is substantially free of chlorides. The water is then displaced by successive washings as, for instance, with 99 per cent isopropyl alcohol, and the gelatinous precipitate in the form of an alcogel is then filtered off and is mixed with the repellent or with the screening compound, the latter with suitable plasticizer until a smooth almost water-white jelly is obtained.

The film-forming material, preferably the mixture of ethyl cellulose and shellac is dissolved in the mixture of alcohol and acetone to form a transparent lacquer about the consistency of molasses. This lacquer is then stirred into the jelly into which the repellent or other skin protective ingredient had been previously introduced. Thereupon the wetting agent is added and finally the entire mass is passed through a colloid mill. The resulting product is an almost transparent jelly sufficiently stiff not to flow freely, but thin enough to spread easily over the surface of the skin when applied by the fingers or a brush, where it dries quickly.

The dry coating on the skin is invisible and is not sticky, does not come off on the clothes and is resistant to water and to perspiration. The film adheres tenaciously to the skin, but is sufficiently elastic to flex therewith, but sufficiently porous to permit free perspiration. It retains its repellent action for 1 to 3 days as contrasted with an effectiveness for not more than 2 or 3 hours were the repellent incorporated in conventional cosmetic cream. The great improvement in effectiveness is explained by the fact that the repellent is adsorbed onto the inorganic jelly and not readily absorbed by the skin and is released or volatilized slowly under the body heat and ambient temperature.

Ordinary organic jellies such as gum arabic or gelatin are of considerably less effectiveness because they liberate the active repellent too readily since they do not have any marked adsorptive action.

As many changes could be made in the above composition and many apparently widely different embodiments of this invention could be made without departing from the scope of the claims, it is intended that all matter contained in the above description shall be interpreted as illustrative and not in a limiting sense.

Having thus described our invention what we claim as new and desire to secure by Letters Patent of the United States is:

1. A protective cream consisting of an alcogel of an inorganic gelatinous hydrous oxide having adsorbed thereon an organic skin protective compound substantially insoluble in water but soluble in alcohol, and including also a film-forming composition and a volatile solvent for the latter, said composition being of character to form a flexible porous film upon evaporation of the solvent.

2. A protective cream consisting of an isopropanol alcogel of silicic acid having adsorbed thereon an insect repellent liquid ingredient substantially insoluble in water and soluble in alcohol and film-forming material together with a volatile solvent for the latter.

3. An insect repellent cream, comprising an isopropanol alcogel of an inorganic gelatinous hydrous oxide, an organic water-insoluble, alcohol-soluble insect repellent liquid adsorbed by said oxide, and having admixed therewith a film-forming material, and a volatile solvent for the latter admixed therewith.

4. A protective cream comprising an alcogel of an inorganic gelatinous hydrous oxide, substantially water-insoluble, alcohol-soluble insect repellent ingredient intimately combined therewith and a film forming material of a mixture of ethyl cellulose and shellac together with a volatile solvent therefor.

5. The combination recited in claim 4 in which the alcogel is the isopropanol alcogel of silicic acid.

WALTER F. HUPPKE.
AXEL L. SODERGREEN.

REFERENCES CITED

The following references are of record in the file of this patent:

UNITED STATES PATENTS

| Number | Name | Date |
|---|---|---|
| 2,204,981 | Clough | June 18, 1940 |
| 2,383,990 | Quisling | Sept. 4, 1945 |

OTHER REFERENCES

Prout, Journal of the American Pharmaceutical Association, Scientific Edition, vol. 29, Aug. 1940, page 372.

Schwartz, Journal of the American Medical Association, May 15, 1943, page 160.

Journal of the American Medical Association, vol. 122, June 5, 1943, pages 373, 374.

Bennett, Cosmetic Formulary (1937) pages 71, 72.

Mellor, Inorganic and Theoretical Chemistry, vol. 6 (1925), page 304.

Kalish, Drug and Cosmetic Industry, vol. 51, pages 44–45, July 1942.

Pharmaceutical Journal, May 10, 1941, page 215.